United States Patent
McCoy et al.

(10) Patent No.: US 9,970,583 B2
(45) Date of Patent: *May 15, 2018

(54) WATER HAMMER ARRESTER

(71) Applicant: Ayrlett LLC, Nampa, ID (US)

(72) Inventors: Daniel L. McCoy, Nampa, ID (US); Leonard G. Franklin, Nampa, ID (US)

(73) Assignee: Ayrlett LLC, Nampa, ID (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/797,410

(22) Filed: Jul. 13, 2015

(65) Prior Publication Data
US 2015/0323115 A1    Nov. 12, 2015

Related U.S. Application Data

(63) Continuation of application No. 12/990,344, filed as application No. PCT/US2009/042118 on Apr. 29, 2009, now Pat. No. 9,080,709.

(60) Provisional application No. 61/048,723, filed on Apr. 29, 2008.

(51) Int. Cl.
  *F16L 55/04*  (2006.01)
  *F16L 55/053*  (2006.01)

(52) U.S. Cl.
  CPC ....... *F16L 55/053* (2013.01); *F15B 2201/205* (2013.01); *F15B 2201/215* (2013.01); *Y10T 29/49826* (2015.01); *Y10T 29/49828* (2015.01); *Y10T 156/10* (2015.01)

(58) Field of Classification Search
  CPC .............................. F16L 55/053; Y10T 156/10

USPC ........................................................ 138/30, 31
See application file for complete search history.

(56) References Cited

U.S. PATENT DOCUMENTS

| | | | |
|---|---|---|---|
| 2,273,766 A | | 2/1942 | Tower, Jr. |
| 2,545,867 A | | 3/1951 | Baker |
| RE24,223 E | * | 9/1956 | Ford et al. ............... F15B 1/24 138/31 |
| 3,158,180 A | * | 11/1964 | Greer ...................... F15B 1/24 138/31 |
| 3,557,827 A | | 1/1971 | Marsh |
| 3,613,734 A | * | 10/1971 | Elmer ...................... F15B 1/24 138/31 |
| 3,633,627 A | * | 1/1972 | Perrott .................... F15B 1/24 138/31 |
| 4,693,276 A | | 9/1987 | Fulmer |
| 4,738,339 A | | 4/1988 | Taylor |
| 4,819,698 A | | 4/1989 | Ismert |
| 5,385,172 A | | 1/1995 | Perrott et al. |
| 5,655,569 A | | 8/1997 | Tackett |
| 5,721,664 A | | 2/1998 | Uken et al. |
| 5,744,047 A | | 4/1998 | Gsell et al. |
| 5,857,753 A | | 1/1999 | Gowda |
| 6,095,195 A | | 8/2000 | Park et al. |
| 6,154,961 A | | 12/2000 | Park et al. |

(Continued)

OTHER PUBLICATIONS

International Search Report and Written Opinion, PCT/US2009/42118, dated Dec. 22, 2010.

(Continued)

*Primary Examiner* — Vishal Pancholi
(74) *Attorney, Agent, or Firm* — Colby Nipper PLLC

(57) ABSTRACT

A water hammer arrester having a cap assembly, a piston assembly, a pair of o-rings, and a base assembly, wherein the cap assembly, piston assembly and base assembly are made from plastic.

19 Claims, 2 Drawing Sheets

(56) References Cited

U.S. PATENT DOCUMENTS

| 6,263,912 | B1 | 7/2001 | Brown et al. |
|---|---|---|---|
| 6,539,976 | B1 | 4/2003 | Whiteside |
| 9,080,709 | B2 | 7/2015 | McCoy et al. |
| 2004/0200797 | A1 | 10/2004 | Hicks et al. |
| 2005/0034771 | A1 | 2/2005 | Minnick |
| 2005/0034953 | A1 | 2/2005 | Came |
| 2011/0036437 | A1 | 2/2011 | McCoy et al. |

OTHER PUBLICATIONS

"Final Office Action", U.S. Appl. No. 12/990,344, dated Oct. 23, 2014, 18 pages.
"Non-Final Office Action", U.S. Appl. No. 12/990,344, dated Jan. 27, 2014, 13 pages.
"Notice of Allowance", U.S. Appl. No. 12/990,344, dated Mar. 16, 2015, 9 pages.

* cited by examiner

WATER HAMMER ARRESTER

FIELD OF THE INVENTION

The invention relates generally to an apparatus for plumbing, and more particularly to water hammer arresters.

BACKGROUND OF THE INVENTION

Water hammering in water pipes is caused by a combination of pressure and velocity. Namely, where a quick closing valve snaps shut, pressure and velocity result in hammering. To counteract this, in the prior art, known is the use of a water hammer arrester (e.g., U.S. Pat. No. 2,273,766 (Tower, 1942)).

A water hammer arrester is used in any place where a quick close valve exists in a plumbing system. While curing the problem in a residence can be as simple as installing water hammer arresters on both the cold supply line and the hot supply line, it is more common to find installations of these water hammer arresters at multiple places in the house, for instance: one located at the washing machine, one located at the dishwasher, etc.

A typical water hammer arrester comprises a cylinder including a piston having rubber o-rings that is able to move within the cylinder. The various components (other than the o-rings) of such a water hammer arrester are typically comprised of metal. The cylinder containing an air chamber that is pre-charged with a certain pressure of inert gas, inert gas being used so as to prevent corrosion of the metal components. As the water pressure within the line changes, the water hammer arrester absorbs the kinetic energy propagated in the water thereby preventing hammering. If this energy is not absorbed, the energy would oscillate in recurring cycles through the water between the valve and the source of the pressure until the energy is dissipated, causing the undesirable hammering sound/effect until dissipation takes place.

DESCRIPTION OF THE PREFERRED EMBODIMENTS

Figure 1:
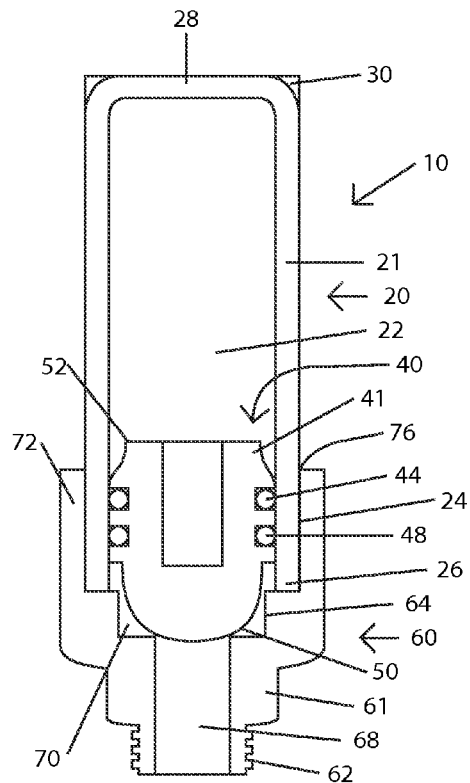
FIG. 1 is a cross sectional view of a first embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

In the following description and in the figures, like elements are identified with like reference numerals. The use of "or" indicates a non-exclusive alternative without limitation unless otherwise noted. The use of "including" means "including, but not limited to," unless otherwise noted.

Figure 2:
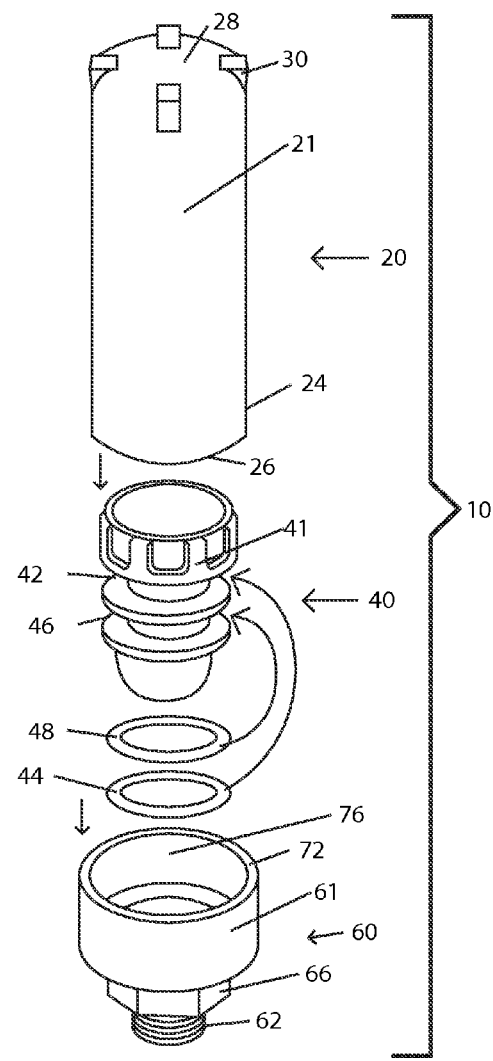
FIG. 2 is an exploded view of the embodiment of FIG. 1.

Referring initially to FIGS. 1 and 2, shown is a first embodiment of a water hammer arrester 10. The water hammer arrester 10 comprising a cap assembly 20, a piston assembly 40, and a base assembly 60.

The cap assembly 20 comprising a cap 21 having an open first end 26 and a closed second end 28, the cap 21 defining an air chamber 22 therein. The cap 21 having a lower exterior sidewall 24 adjacent the open first end 26. In the embodiment shown, at least one ear 30 is provided at the closed second end 28, said ear for better enabling a manufacturing tool to grasp the cap during assembly.

Referring now to the piston assembly 40, the piston assembly 40 comprising a piston 41. The piston having a head 50 and a tail 52. The piston 41 having an exterior surface defining at least one circumvolving channel, preferably a pair of channels (42, 46), configured for receiving therein one or more O-rings, preferably a pair of O-rings (44, 48). The piston 41 having a centering head 50 configured for automatically centering within a base centering receiver 64. The piston 41 configured for insertion into the pressurized air chamber 22 of the cap 21. The piston 41 configured for sliding movement within the air chamber 22 as pressure in the attached plumbing system changes.

Referring now to the base assembly 60, the base assembly 60 comprising a base 61 having an open end 72 and a threaded portion 62 at the opposing end for threading into a standard plumbing fitting (not shown). The base 61 defining an exterior chamber 70 therein surrounded by an interior sidewall 76. Extending through the base 61 is a passageway 68 for interconnecting the exterior chamber 70 with the plumbing system the water hammer arrester 10 is fluidly connected through use of the threaded portion 62 connecting with a plumbing fitting. The piston's centering head 50 being received into this exterior chamber 70, centered within the base centering receiver 64. A plurality of facets 66 may be provided on the outside surface of the base for enabling a wrench or other plumbing tool to be utilized for connecting the assembled arrester to the plumbing fitting via the threaded portion.

Assembly. To assemble the first embodiment (FIGS. 1-2) of the present invention, a piston would be placed within the base, with the piston's centering head centering the piston within the base's centering receiver. In such a configuration, the outer portion of the piston, including the o-rings, rests spaced apart from the lower interior sidewall, leaving a space there-between the general widths of the cap assembly's open first end, forcing the piston into the air chamber (wherein it seals therein). An adhesive could then be applied to the exterior sidewall of the cap and/or the interior sidewall of the base, and the cap's open end then inserted over the piston and into the base's open end, thereby assembling the arrester. Preferably, this assembly takes place in a pressure chamber, for instance with an atmospheric pressure of 40 psi, thereby resulting in pre-pressurization of the air thereby captured in the air chamber at 40 psi (or another, predetermined pressure). While an adhesive is preferred, other types of connections could likewise be utilized, including but not limited to twist-locks, sonic welds, spin welds, threaded ring and flange connections, and threaded connections.

Figure 4:
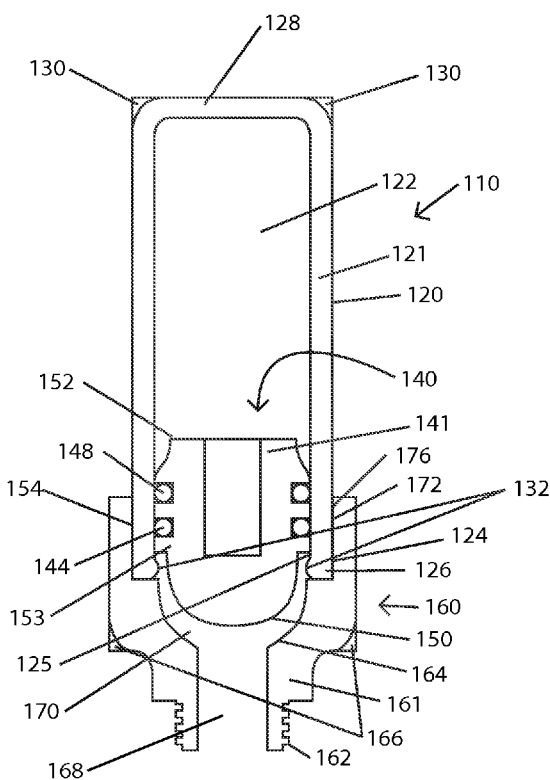
FIG. 4 is a cross sectional view of the embodiment of FIG. 3.
Figure 3:
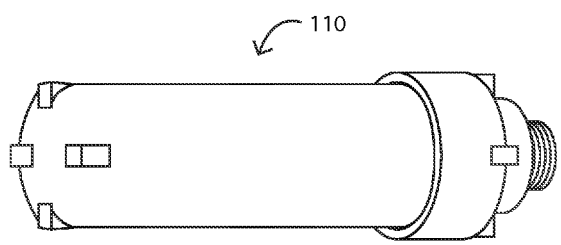
FIG. 3 is a plan view of a second embodiment of the present invention.
Figure 5:
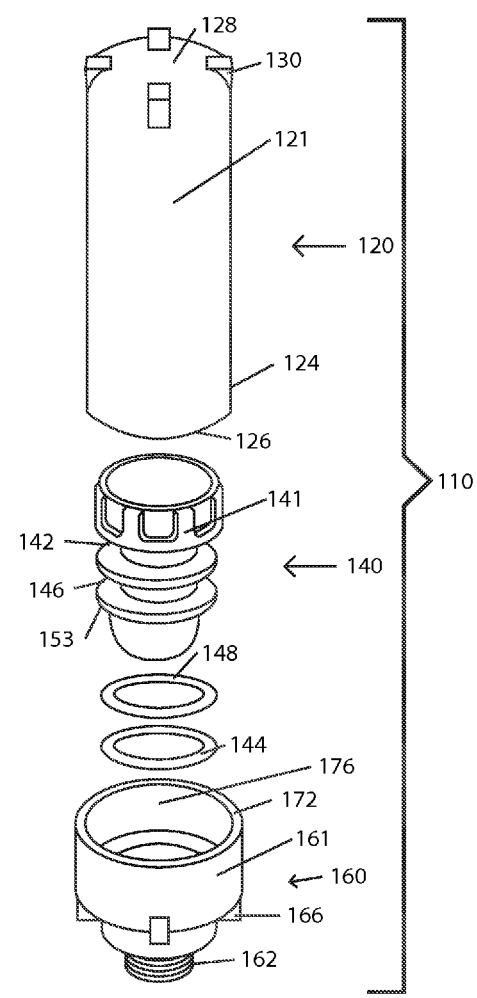
FIG. 5 is an exploded view of the embodiment of FIG. 3.

Referring now to FIGS. 3, 4 and 5, shown is a second embodiment of a water hammer arrester 110. The water hammer arrester 110 comprising a cap assembly 120, a piston assembly 140, and a base assembly 160.

The cap assembly 120 comprising a cap 121 having an open first end 126 and a closed second end 128, the cap 121 defining an air chamber 122 therein. The cap 121 having a lower exterior sidewall 124, and a lower interior sidewall 125 adjacent the open first end 126. The lower interior sidewall 125 comprising at least one retention means 132 extending inwards there-from. The retention means could comprise one or more bumps, flanges, appendages, detents, concentric rings or the like. Alternatively, but less preferred, the retention means could be on the piston, with the lock rim (defined below) present on the interior sidewall.

In the embodiment shown, at least one ear 130 is provided at the closed second end 128, said ears 130 for better enabling a manufacturing tool to grasp the cap during assembly.

Referring now to the piston assembly 140, the piston assembly 140 comprising a piston 141. The piston 141 having a head 150 and a tail 152. The piston 141 having an exterior surface defining at least one circumvolving channel, preferably a pair of channels (142, 146), configured for receiving therein one or more O-rings, preferably a pair of O-rings (144, 148). The piston 141 having a head 150 configured for automatically centering within a base centering receiver 164. Between the circumvolving channel(s) and the head is a lock rim 153. The piston 141 configured for insertion into the pressurized air chamber 122 of the cap 121. The piston 141 configured for sliding movement within the air chamber 122 as pressure in the attached plumbing system changes.

Referring now to the base assembly 160, the base assembly 160 comprising a base 161 having a first open end 172 and a threaded portion 162 at the opposing (second) open end for threading into a standard plumbing fitting (not shown). The base 161 defining an exterior chamber 170 therein surrounded by an interior sidewall 176. Extending through the base 161 is a passageway 168 for interconnecting the exterior chamber 170 with the plumbing system the water hammer arrester 110 is fluidly connected through use of the threaded portion 162 connecting with the plumbing fitting (not shown). The piston's head 150 being received into this exterior chamber 170, centered within the base centering receiver 164. A plurality of mechanical holding fixtures 166 may be provided on the outside surface of the base for better enabling a manufacturing tool to grasp the base assembly during assembly.

Assembly. To assemble the second embodiment (FIGS. 4-5) of the present invention, preferably within a pressure chamber, for instance a pressure chamber with an atmospheric pressure of 40 psi, the tail 152 of the piston assembly 140 is inserted into the open first end 126 of the cap assembly 120 and the piston 140 is pushed into the air chamber 122 until the lock rim 153 clears the cap assembly's retention means 132 thereby resulting in pre-pressurization of the air thereby captured in the air chamber at 40 psi (or another, predetermined pressure). Through this process, the lower interior sidewall 125 may slightly flex outwards to permit the piston's lock rim 153 to pass over the retention means 132. The retention means temporarily holds the piston within the cap assembly.

After the piston is mounted in the cap, the open first end 126 can then be inserted into the base assembly's open end 172, the base interior sidewall 176 serving to reinforce the open first end 126 and prevent flexion of the lower interior sidewall 125 outwards thereby locking the piston within the air chamber beyond the retention means.

The cap assembly 120 is then fixed to the base assembly 160, preferably through a spin weld. While a spin weld is preferred, other manners of fixing the components together are possible, including but not limited to sonic welds, adhesives, twist-locks, threaded ring and flange connections, and threaded connections.

Through such an assembly, natural atmospheric air can be used as the charging gas instead of the inert gas required by the prior art. As discussed above, because prior art water hammer arresters comprise metal, inert gas is necessary to prevent corrosion. However, in the disclosed invention, plastic components (as discussed below) are utilized thereby removing the need for inert gas to be used. This step being a cost savings for the assembly of the end product.

Copper, bronze or other plating may be applied to the present invention's exterior surface for making the device look more like a traditional (metal) water hammer arrester.

It is preferred that the cap, piston and base of the present invention be made from an acetal homopolymer, such as polyoxymethylene (also known as DuPont Delrin®). Optionally, one or more of the components could be made from a nylon resin such as DuPont Zytel®. Such more preferred nylon resins being high strength, abrasion and impact resistant thermoplastic polyamide formulations of the nylon family, often with varying degrees of fiberglass, from 13% to 60%, added in for additional stiffness can be used. The one Zytel® formulation that could be used is DuPont's "Zytel® HTN high performance polyamides," including but not limited to HTN51G35HSLR BK420[5], but other formulations are likewise suitable. Other suitable plastics may also be used.

One additional benefit to the present invention using plastic components is that the atmospheric air can be utilized in the pressure chamber in that there is no possibility of corrosion like happens in metal components. The avoidance of the necessity of using inert gas simplifies the manufacturing process and reduces cost.

Another benefit is that certain plastics are self-lubricating (e.g., acetal homopolymer, polyamide), meaning that through wear, molecules are released that result in lubrication of the o-rings. For additional lubrication, the o-rings may be lubricated with 100% silicone or other suitable material before assembly. In some embodiments, Teflon (TPFE) or similar compounds can be incorporated into the plastic's formulation to assist with lubrication.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A water hammer arrester, said water hammer arrester configured for threading into a plumbing fixture attached to a plumbing system, comprising:
   a cap assembly, the cap assembly comprising a cap having an open first end and a close second end, the cap defining an air chamber therein, the cap having a lower exterior sidewall and a lower interior sidewall adjacent the open first end, said cap assembly made of a plastic selected from the group of acetal homopolymers and polyamides, wherein the lower interior sidewall comprises at least one retention portion extending inwards there-from;
   a piston assembly, the piston assembly comprising a piston, the piston configured for sliding movement within the air chamber as pressure in the attached plumbing system changes, said piston assembly made of a plastic selected from the group consisting of acetal homopolymers and polyamides, wherein said retention portion is formed in said cap assembly before said piston is inserted into said cap assembly
   a base assembly, the base assembly comprising a base having a first open end and a second open end, said second open end comprising a threaded portion for threaded connection with said plumbing fixture, the base defining an exterior chamber therein surrounded by an interior sidewall, extending through the base is a passageway for interconnecting the first open end with the second open end, said exterior chamber configured for receiving therein said cap assembly open first end, wherein said cap can be fixed to said base assembly thereby encasing said piston assembly therein, said base assembly comprising a plastic selected from the group consisting of acetal homopolymers and polyamides.

2. The water hammer arrester of claim 1, wherein the base comprises an outside surface which comprises a plurality of mechanical holding fixtures for better enabling a manufacturing tool to grasp the base assembly during assembly.

3. The water hammer arrester of claim 1, wherein the cap comprises an outside surface which comprises a plurality of ears for better enabling a manufacturing tool to grasp the cap assembly during assembly.

4. The water hammer arrester of claim 1, wherein said piston comprises a head and a tail, and wherein said base assembly comprises a base centering receiver configured for receiving said head therein and automatically centering said piston within said exterior chamber before said base assembly is attached to said cap assembly, thereby expediting the assembly of said water hammer arrester.

5. The water hammer arrester of claim 1, wherein said piston comprises an exterior surface defining at least one circumvolving channel configured for receiving therein at least one O-ring, wherein said piston comprises a head and a tail, wherein between said at least one circumvolving channel and the head is a lock rim configured for locking against said at least one retention portion, wherein said piston is inserted into said cap assembly so that said lock rim passes said at least one retention portion, said at least one retention portion thereby holding said piston within said cap assembly, wherein a portion of said head is generally dome-shaped.

6. The water hammer arrester of claim 1, wherein said piston comprises an exterior surface defining at least one circumvolving channel configured for receiving therein at least one O-ring.

7. The water hammer arrester of claim 1, wherein the lower interior sidewall of the cap comprises at least one retention portion extending inwards there-from, said retention portion configured for retaining said piston within said interior chamber after said piston is inserted into said cap assembly.

8. The water hammer arrester of claim 7, wherein the interior sidewall has a circumference, wherein the retention portion has a circumference, and wherein the circumference at the retention portion is smaller than the interior sidewall circumference.

9. The water hammer arrester of claim 7, wherein the piston has a circumference smaller than the interior wall circumference, but greater than the circumference at the retention portion.

10. The water hammer arrester of claim 7, wherein when the piston is inserted into the cap, the cap flexes outwards at the retention portion to allow the piston to pass the retention portion, temporarily retaining the piston within the cap.

11. The water hammer arrester of claim 1, wherein when the base is attached to the cap, the cap is no longer able to flex outwards, thereby permanently locking the piston within the cap.

12. A water hammer arrester, said water hammer arrester configured for threading into a plumbing fixture, comprising:
   a cap assembly, the cap assembly comprising a cap having an open first end and a closed second end, the cap defining an air chamber therein, the cap having a lower exterior sidewall and a lower interior sidewall adjacent the open first end, wherein the lower interior sidewall comprising at least one retention portion, said retention portion extending inwards therefrom;
   a piston assembly, the piston assembly comprising a piston, the piston having a head and a tail, piston having an exterior surface defining at least one circumvolving channel configured for receiving therein at least one o-ring, the piston configured for sliding movement within the air chamber as pressure in the attached plumbing system changes, wherein between said at least one circumvolving channel and the head is a lock rim configured for locking against said at least one retention portion, and wherein a portion of said head is generally dome-shaped; and
   a base assembly, the base assembly comprising a base having a first open end and a second open end, said second open end comprising a threaded portion for threading into said plumbing fixture, the base defining an exterior chamber therein surrounded by a base assembly interior sidewall, extending through the base is a passageway for interconnecting the first open end with the second open end, said exterior chamber configured for receiving therein said cap assembly open first end, wherein said lower exterior sidewall can be fixed to said base assembly interior sidewall thereby encasing said piston assembly therein,
   wherein said piston is configured to be inserted into said cap assembly so that said lock rim passes said at least one retention portion, said at least one retention portion thereby holding said piston within said cap assembly.

13. The water hammer arrester of claim 12, wherein said cap assembly, said base assembly and said piston assembly are made of a plastic selected from the group consisting of acetal homopolymers and polyamides.

14. The water hammer arrester of claim 12, wherein the outside surface of the base comprises a plurality of mechanical holding fixtures for better enabling a manufacturing tool to grasp the base assembly during assembly.

15. The water hammer arrester of claim 12, wherein the outside surface of the cap comprises a plurality of ears for better enabling a manufacturing tool to grasp the cap assembly during assembly.

16. The water hammer arrester of claim 12, wherein said base assembly comprises a base centering receiver configured for receiving said head therein and automatically centering said piston within said exterior chamber before said base assembly is attached to said cap assembly, thereby expediting the assembly of said water hammer arrester.

17. A method of assembling a water hammer arrester, said water hammer arrester for attachment with a standard plumbing fitting, said method comprising the following steps:
   providing a piston assembly, the piston assembly comprising a piston;
   providing a cap assembly, the cap assembly comprising a cap having an open first end and a closed second end, the cap defining an air chamber therein, the cap having a lower exterior sidewall and a lower interior sidewall adjacent the open first end, the lower interior sidewall comprising at least one retention portion extending inwards there-from;
   providing a base assembly, the base assembly comprising a base having an open end and a threaded portion at an opposing end for threading into said standard plumbing fitting, the base defining an exterior chamber therein surrounded by an interior sidewall, extending through the base is a passageway for interconnecting the exterior chamber with a plumbing system the water hammer arrester is fluidly connected through use of the threaded portion connecting with a plumbing fitting;
   inserting said cap assembly, piston assembly, and base assembly into a high pressure chamber;
   pressurizing said high pressure chamber;
   inserting said piston into the open first end of said cap assembly and into said air chamber until the piston clears the retention portion thereby locking said piston inside said cap assembly;
   inserting the open first end of said cap assembly into the open end; and
   fixing said cap assembly to said base assembly, and wherein the at least one retention portion is formed in said cap assembly before said piston is inserted into said open first end of said cap assembly.

18. A water hammer arrester, said water hammer arrester configured for coupling with a plumbing fixture attached to a plumbing system, said water hammer arrester comprising:
   a cap assembly, the cap assembly comprising a cap having an open first end and a closed second end, the cap defining an air chamber therein, the cap having a lower exterior sidewall and a lower interior sidewall adjacent the open first end, the cap comprising an exterior sidewall extending from said open first end to said closed second end, wherein said exterior sidewall has the same outside diameter from the open first end to adjacent the closed second end; and
   a piston assembly, the piston assembly comprising a piston, the piston configured for sliding movement within the air chamber as pressure in the attached plumbing system changes,
   wherein the lower interior sidewall of the cap comprises at least one retention portion extending inwards therefrom, said retention portion configured for temporarily retaining said piston within said air chamber after said piston is inserted into said cap assembly but before a base assembly is fixed to said cap assembly.

19. The water hammer arrester of claim 18, wherein the base assembly further comprising a base having a first open end and a second open end, said second open end comprising a connection with said plumbing fixture, extending through the base is a passageway for interconnecting the first open end with the second open end, said first open end configured for sealing connection to said cap assembly open first end, wherein said cap assembly can be fixed to said base assembly thereby encasing said piston assembly therein.

* * * * *